Feb. 8, 1966 M. H. HEBB 3,234,351
VACUUM DEVICES HAVING ARC ELECTRODES FREE OF ADSORBED GAS
AND GAS-FORMING CONSTITUENTS
Filed Oct. 19, 1961
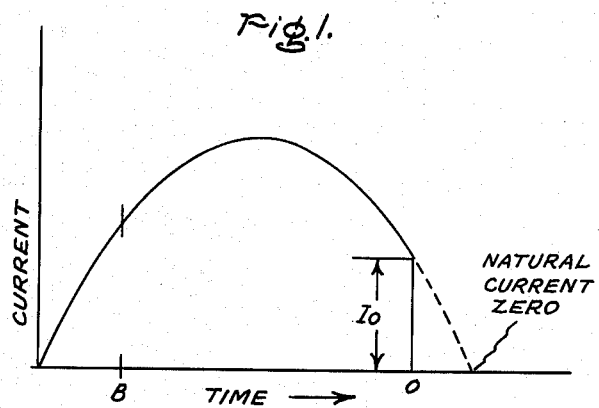
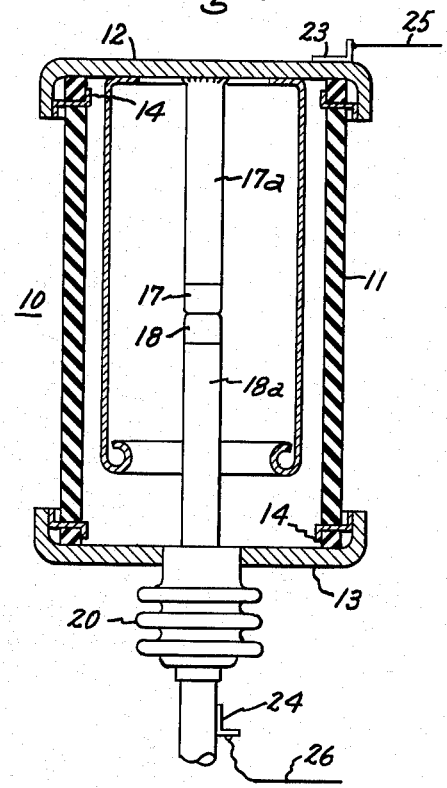
Inventor:
Malcolm H. Hebb,
by Joseph V. Claeys
His Attorney.

United States Patent Office 3,234,351
Patented Feb. 8, 1966

3,234,351
VACUUM DEVICES HAVING ARC ELECTRODES FREE OF ADSORBED GAS AND GAS-FORMING CONSTITUENTS
Malcolm H. Hebb, Schenectady, N.Y., assignor to General Electric Company, a corporation of New York
Filed Oct. 19, 1961, Ser. No. 146,245
1 Claim. (Cl. 200—144)

This invention relates to vacuum circuit interrupters and in particular to vacuum circuit interrupters having electrodes of high vapor pressure metals.

This application is a continuation-in-part of my co-pending application, Serial No. 854,392, filed November 20, 1959, entitled "Vacuum-Type Circuit Interrupter," and now abandoned.

As used herein the term "metal" is intended to include the elemental metals as well as metalloids and compounds such as the carbides of tungsten and molybdenum which exhibit metallic characteristics. A "high vapor pressure" metal as used herein refers to one having a vapor pressure greater than $10^{-3}$ millimeters of mercury at temperatures above 2000° K.

Vacuum circuit interrupters having electrodes comprising metals having vapor pressures within certain prescribed high limits are capable of providing alternating current circuit interrupting operations where the maximum permissible current chopping level is very low. Vacuum circuit interrupters of this type wherein the current chopping level is four amperes or less are disclosed and claimed in United States Patent No. 2,975,256, Lee et al., issued March 14, 1961 and assigned to the assignee of this invention. In addition, other vacuum circuit interrupters capable of performance in this manner are disclosed and claimed in the copending application of J. M. Lafferty, Serial No. 750,615, filed July 24, 1958, now United States Patent No. 3,016,436 and assigned to the assignee of the present invention. Further, other metals such as copper, silver and the like, which are included within the above definition of high vapor pressure metals, are well suited as electrodes for vacuum circuit interrupters.

Although vacuum circuit interrupters having electrodes of high vapor pressure metals are highly desirable for a great many uses, it has heretofore been extremely difficult, expensive and uncertain to produce such devices which have the desired high degree of reliability and lifetime.

It is an object of this invention, therefore, to provide a vacuum circuit interrupter having electrodes of high vapor pressure metals and which may be consistently produced with a required reliability of operation.

It is another object of this invention to provide a vacuum circuit interrupter having electrodes comprising high vapor pressure metal which electrodes evolve essentially no gas under arcing conditions.

It is a further object of this invention to provide an extremely reliable vacuum circuit interrupter having electrodes comprising high vapor pressure metal which is suitable for all circuit applications including inductive alternating current circuits and which is not subject to excessive pressure build-up due to evolution of gas from the electrodes during arcing.

Briefly stated, in accordance with one aspect of this invention, I provide a vacuum circuit interrupter including a pair of separable main electrodes disposed within an envelope evacuated to a pressure lower than about $10^{-5}$ millimeters of mercury and means for connecting the electrodes to a circuit to be interrupted. At least one main electrode includes a region on which an electrode spot for an arc may be established which comprises a gas-free and gas-forming constituent-free metal having a vapor pressure less than $10^{-3}$ millimeters of mercury at 500° K. and greater than $10^{-3}$ millimeters of mercury at temperatures above 2000° K.; the metal being freed from gases and gas-forming constituents by a controlled directional crystallization from a melt in a chemically inert atmosphere with the resultant growth of a crystalline structure having grains with a surface-to-volume ratio of no greater than 6 per centimeter.

The novel features which are believed characteristic of this invention are set forth with particularity in the appended claims. The invention itself, however, both as to its organization and method of operation, as well as further objects and advantages thereof, may best be understood from the following description when read in connection with the accompanying drawing, in which:

FIGURE 1 is a curve illustrating the current chopping phenomenon; and,

FIGURE 2 is a vertical sectional view of a vacuum circuit interrupter constructed in accordance with this invention.

In a high-vacuum circuit interrupter, the dielectric strength of the vacuum is very high because there are so few molecules of gas remaining in the envelope that electrons can travel across the various gaps between the high voltage parts of the interrupter with little probability of colliding with the few gas molecules that are present. It is these collisions that are primarily responsible for ionization and resultant electrical breakdown. Only with pressures less than about $10^{-5}$ millimeters of mercury is there a reasonable assurance that the "mean-free path" of an electron will be longer than the potential breakdown paths in the interrupter. It is only under these conditions that the high level of dielectric strength generally required in a commercial vacuum circuit interrupter is achieved.

In order for electrodes to perform in an acceptable manner in vacuum circuit interrupters it is most important that they have sorbed gas and gas-forming constituents removed. If this is not done gases would be profusely evolved during current interruptions which heat the internal contact regions of the electrodes to extremely high temperature. The evolved gases manifest themselves in a pressure buildup within the evacuated envelope and thus impair the dielectric strength of the vacuum at the very instant when maximum dielectric recovery is needed in order to prevent arc re-establishment after current zero.

An exhaustive study of the gas evolved from various electrodes has shown the importance of gas content. This can be shown by the following calculation. The rate of erosion of copper electrodes, for example, in the area of the arc is about 85 grams per square centimeter per second for the arc foot point areas. For a 10,000 ampere arc of one half cycle duration, a current density of 30,000 amperes per square centimeter may be assumed. This would result in the vaporization of 0.282 gram per electrode, or 0.0318 cc. If one part in a million of gas were present, this would result in the release of about $9.55 \times 10^{14}$ atoms of gas. For a one liter volume circuit interrupter, and assuming the erosion of both contacts to be equal, this would result in a pressure of $5.36 \times 10^{-5}$ millimeters of mercury. In a one liter volume interrupter it has been determined that if the pressure exceeds $5 \times 10^{-5}$ millimeters of mercury, a prohibitively long time is required for "clean up" before the interrupter can function again. A single such opeartion would be fatal in an interrupter of smaller volume. A satisfactory gas impurity level for electrodes in vacuum circuit interrupters of this invention is about 1 part in 10 million.

The gas content of the electrodes is determined by placing them in an evacuated chamber of one liter volume and deeply eroding them by repeated electric arcing. The resulting rapid vaporization of metal releases the permanent gases or gas-forming constituents from the electrodes which then accumulate in the evacuated vessel. The change in pressure after arcing gives a satisfactory indication of the gas content. For an electrode for use in this invention the pressure within the chamber after arcing must remain as low as substantially its initial value. This must hold in the absence of getters and pumps and even when the initial pressure in the chamber is on the order of $10^{-5}$ millimeters of mercury or lower.

Because of the requirement that the electrodes of vacuum circuit interrupters be essentially free of gas and gas-forming constituents most prior art devices have used electrodes formed of refractory metals such as tungsten or molybdenum. Such metals are easy to free of gases and gas-forming constituents by baking at extremely high temperatures, of the order of several thousand degrees centigrade, for long periods of time. These prior devices, however, have not been entirely satisfactory for use in many circuit applications. For example, these devices cause premature extinction, or "chopping," of an alternating current arc due to vapor starvation with the resultant creation of voltage surges. As a consequence, such prior art devices have not been entirely satisfactory for many applications.

By "chopping" is means forcing of the current to zero abruptly and prematurely before a natural current zero may occur. Ideally, after separation of the contacts of an interrupter, an arc would persist until a natural current zero were reached. In low current interruptions, however, this ideal condition does not always prevail.

This chopping action is illustrated in FIGURE 1 where the current flowing between the contacts is plotted against time. It can be assumed that the contacts are parted to establish an arc at an instant such as shown at B. The arc is maintained up until about the instant 0 and so the current is free to follow substantially its natural curve up until this instant. At the instant 0, however, the current is forced abruptly and prematurely to zero before the natural current zero is reached. The amount of current "chopped" is designated $I_o$, and this quantity is referred to herein as the "chopping current," or "chopping current level."

A vacuum circuit interrupter which substantially overcomes the high chopping current problem is disclosed and claimed in the above referenced Patent No. 2,975,256 of Lee et al. The solution to this problem involves using, for the contacts of the vacuum circuit interrupter, particular metals and alloys having vapor presures within certain preselected high limits. Examples of contact metals capable of performing in this manner, where the maximum permissible chopping level is 4 amperes or less, are: tin, antimony, lead, zinc, bismuth and suitable alloys thereof. Other metals which are capable of performance in this manner are disclosed and claimed in the copending application, Serial No. 750,615 of James M. Lafferty, filed July 24, 1958, now United States Patent No. 3,016,436 and assigned to the assignee of the present invention. These metals are intermetallic compounds including $Al_2Ce$, $Al_2La$, $AlSb$, $Bi_3Ce_4$, $Be_2Mg_3$, $SnCe_2$, $SnLa_3$, $PbLa_2$, $MgSb$, $Sn_2Ce$, $Sn_4La$, $Cu_2Ce$ and $Cu_4La$. In addition, metals such as copper and silver are well suited for electrodes for the vacuum circuit interrupters of this invention. For example, these metals all have a lower current chopping level than have the refractory metals. The above metals, because of their high vapor pressures, supply a copious quantity of conduction carriers to the arc to prevent vapor starvation.

The limitations of prior art vacuum circuit interrupters having refractory metal electrodes makes it extremely desirable that there be provided vacuum circuit interrupters wherein these limitations are substantially overcome. As described hereinbefore and in the above referenced patent and patent application, this may be accomplished by providing vacuum circuit interrupters having electrodes comprising high vapor pressure metals. As noted above the metals may be in elemental form or as a constituent of an alloy or intermetallic compound. Because of the low melting points of these latter metals, however, it has been found to be extremely difficult and uncertain to consistently produce such vacuum circuit interrupters which are essentially free from pressure build-up due to the release of gas from the electrodes during arcing thereby greatly effecting the reliability of such interrupters as well as their efficiency and lifetime.

In FIGURE 2 there is shown a vertical sectional view of a vacuum circuit interrupter constructed in accordance with this invention and which is not subject to excessive pressure build-up under operating conditions. The circuit interrupter comprises a highly evacuated envelope 10 including a casing 11 of suitable insulating material and a pair of metallic end caps 12 and 13 closing off the ends of the casing. Suitable seals 14 are provided between the end caps and the casing to render the envelope 10 vacuum-tight. The normal pressure within the envelope under static conditions is lower than $10^{-5}$ millimeters of mercury and is preferably in the range of about $10^{-6}$ to $10^{-8}$ millimeters of mercury.

Located within the envelope 10 is a pair of electrodes 17 and 18, shown in their engaged or closed circuit position, each including a region on which the respective electrode spots for an arc may be established. The upper contact 17 is a stationary contact suitably attached to a conducting rod 17a, which is united at its upper end to the upper end cap 12. The lower contact 18 is a movable contact, joined to a conductive operating rod 18a which is suitably mounted for vertical movement. The operating rod 18a projects through an opening in the lower end cap 13, and a flexible metallic bellows 20 provides a seal about the rod 18a to allow for vertical movement of the rod without impairing the vacuum inside the envelope 10. The bellows 20 is sealingly secured at its respective opposite ends to the operating rod 18a and the end cap 13.

Coupled to the lower portion of the operating rod 18a there is provided suitable actuating means (not shown) which are capable of driving the contact 18 downwardly out of engagement with the contact 17 so as to open the interrupter, establishing a circuit interrupting arc, and which means are capable of returning the contact 18 to its illustrated position so as to close the interrupter by bringing the electrodes in contact with each other.

Suitable terminals, schematically illustrated at 23 and 24 are provided for connecting the interrupter to an alternating current circuit. The upper terminal 23 is electrically connected to the upper contact 17 through the conductive parts 12 and 17a, and the lower terminal 24 is connected to the lower contact 18 through the conductive operating rod 18a. When the interrupter is in the closed position of FIGURE 1 current can flow between terminals 23 and 24 through the engaged contacts 17 and 18.

To simplify the description of the operation of the vacuum circuit interrupter of this invention, it will be convenient to assume that the circuit interrupter is connected in an alternating current circuit 25, 26 and that it is desired to interrupt current flowing therein. To this end the contact 18 would be driven downwardly out of engagement with the contact 17 to establish a circuit interrupting arc which ideally should persist until a natural current zero is reached, after which the arc is prevented from being re-established by the high dielectric strength of the vacuum.

In accordance with this invention at least the region on which the electrode spot for an arc may be established, of at least one of the electrodes, comprises at least one gas-free and gas-forming constituent-free metal having a vapor pressure of less than $10^{-3}$ millimeters of mercury at 500° K. and a vapor pressure greater than $10^{-3}$ millimeters of mercury at temperatures above 2000° K. Further, the metal is freed of gas and gas-forming constituents by a controlled directional crystallization from a melt in a chemically inert atmosphere with the resultant growth of solid in which the crystals have a surface-to-volume ratio smaller than 6 per centimeter. In general, crystals having the required surface-to-volume ratio of less than 6 per centimeter have their smallest dimension larger than about two millimeter.

As used herein and in the appended claim the terms "controlled directional crystallization in a chemically inert atmosphere" means crystallization in a vacuum as well as crystallization in an atmosphere of a gas which is insoluble in the metal being purified as, for example, an inert gas such as argon. Further, the crystallization from the melt must be controlled to establish large crystals which are formed in a given direction to assure that gas and gas-forming constituents will be moved to where they may be eliminated either by flushing with an inert gas, vacuum pumping, discarding a portion of the metal, or any combination of these. This is required since it is possible to form large crystals whose surface-to-volume ratio is smaller than 6 per centimeter merely by providing for sufficiently slow cooling. The formation of large crystals under such conditions, however, would not remove gas and gas-forming constituents from the metal. For example, if such slow cooling takes place in the presence of a gas which is soluble in the metal being cooled, a great quantity of such gas may be introduced therein. Similarly, if the crystallization is not directionally controlled gas and gas-forming constituents may be trapped in the crystalline structure of the metal. Thus, for use in electrodes for vacuum circuit interrupters of this invention the metal must be freed of gas and gas-forming constituents by a controlled directional crystallization in a chemically inert atmosphere and have crystals whose surface-to-volume ratio is no greater than 6 per centimeter.

The required controlled directional crystallization may take place along a moving liquid-solid interface in an atmosphere of argon or in a vacuum, for example, and wherein the temperature, rate of travel of the liquid-solid interface, and other parameters are correlated to assure a crystalline structure having the required surface-to-volume ratio of less than 6 per centimeter. For example, such crystallization may be provided by a zone refining technique wherein the critical parameters are appropriately controlled to provide the metal, on solidification, with crystals having the required surface-to-volume ratio of no greater than 6 per centimeter.

Alternatively, metal having the required crystalline structure for purposes of this invention may be provided by vacuum melting processes wherein, once again, the crystallization has been controlled as to rate and direction to assure the formation of crystals whose surface-to-volume ratio is less than 6 per centimeter. Thus the crystal growth in a given direction allows for the movement of the gas and gas-forming constituents to where they may be removed. In this instance directional crystallization is obtained by a controlled, non-uniform cooling of the molten metal.

Various refining methods for purifying metals, including the high vapor pressure metals, are known in the art. In general the vacuum melting methods appear to be the most widely used methods for reducing the amount of gas in a metal. The most effective of the vacuum melting methods seem to be "vacuum induction melting" and "consumable electrode arc vacuum melting." The latter method is more often called merely "vacuum arc melting." The metal to be used in constructing electrodes for vacuum circuit interrupters is subjected repeatedly to such treatment.

The above vacuum melting methods, as well as others such as the various zone refining techniques, result in achieving relatively pure metal. The usual methods heretofore employed for determining the amount of gas or gas-forming constituents in a metal, however, were incapable of detecting the very small quantity of gas, which if present, would render the electrodes unsuitable for use in vacuum circuit interrupters. This resulted in a great lack of uniformity with respect to the refined metal. Thus, the designation of a metal as being "pure" or "extremely pure" bore little or no relationship to the problem of whether or not a vacuum circuit interrupter, having high vapor pressure electrodes constructed therefrom, would or would not be subject to excessive pressure build-up due to evolution of gas from the electrodes during arcing.

This resulted in a great lack of uniformity with respect to the refined metal since no definite number of repeated treatments could insure that the gas content of the metal would be significantly below one part per million, for example. A metal having a gas content considerably greater than this would usually be considered "extremely pure" but still unsatisfactory for use as vacuum circuit intruppter electrodes. Thus, to obtain high vapor pressure metals having a gas content of the order of one part in ten million for use in the construction of vacuum circuit interrupter electrodes was difficult, expensive and extremely unreliable.

The only way of approaching the necessary criteria of gas freedom was to repeat the refining processes over and over often hundreds of times, until, if fortunate, the desired freedom was obtained. This expedient is, obviously, wholly inadequate and prohibitively expensive.

In further accord with this invention, therefore, electrodes for vacuum circuit interrupters of this invention may be constructed from a blank which comprises a metal having a vapor pressure less than $10^{-3}$ millimeters of mercury at 500° K. and a vapor pressure greater than $10^{-3}$ millimeters of mercury at temperatures above 2000° K. having unremoved gas and gas-forming constituents in an amount not exceeding one part in ten million and crystals whose surface-to-volume ratio is less than 6 per centimeter.

The term "unremoved gas and gas-forming constituents" is used herein and in the appended claims to mean those gases, and constituents which form gas under arcing conditions, which are present in the electrode, or the metal blank from which the electrode is constructed, and which remain in the metal blank or the electrode after the appropriate purification process has been completed. For example, for a vacuum circuit interrupter of this invention the unremoved gas and gas-forming constituents in the electrodes must not be greater than one part in $10^7$.

Although ideally the electrode may comprise the blank itself or an apropriate portion thereof having the desired large crystal size, the usual size and shape of this blank, as obtained, may not be suitable without having further working or other operations performed upon it. These operations are necessary to produce the desired electrode configuration. Since any such operations result in a reduction of the crystal size the completed electrode in the vacuum circuit interrupter of this invention may, as a consequence, have a much smaller crystal size. I have found, however, that such further operations which drastically alter the crystal size of the blank itself may be performed upon the metal blank without undesirably changing the characteristics of the electrode for vacuum circuit interrupters of this invention. Any surface contamination resulting from such operations may be readily removed from the electrode during fabrication of the vacuum circuit interrupter by a baking out treatment at elevated temperature.

For example, it has been found that such a blank, having unremoved gas and gas-forming constituents in an amount not exceeding one part in ten million and crystals whose surface-to-volume ratio is less than 6 per centimeter, may be extruded, cast, alloyed, compounded, and otherwise operated upon in constructing the vacuum circuit interrupter electrode with the resulting electrode still having unremoved gas and gas-forming constituents in an amount not exceding one part in ten million although the final crystal size thereof may be much smaller than the specified crystals of the blank. For example, the desired electrode may be constructed by alloying the individual constituents of metal from blanks each of which has unremoved gas and gas-forming constituents in an amount not exceeding one part in ten million and crystals whose surface-to-volume ratio is less than 6 per centimeter. Similarly, an intermetallic compound electrode may be prepared from blanks of the required metals to be compounded each of which has the specified characteristics and structure.

These operations must, however, be carried out under such conditions that gas and gas-forming constituents are not reintroduced into the electrode during its construction. In many such electrodes formed from such a metal blank, the unremoved gas and gas-forming constituents, which manifest themselves as a pressure build-up within the circuit interrupter under arcing conditions, is found to be less than about one part in $10^9$.

A suitable metal blank of high vapor pressure metal having unremoved gas and gas-forming constituents in an amount no greater than one part in ten million and crystals with a surface-to-volume ratio no greater than 6 per centimeter may be prepared in the following manner.

A conventional horizontal boat zone refining apparatus is used employing means adapted to cause one or more molten zones to traverse the metal ingot being purified from one end thereof to the other. The boat is constructed of graphite and the molten zones are produced by radio-frequency coils connected to a high frequency oscillator capable of delivering sufficient power to the coils to melt the narrow zone of metal within the coil. The power supply is a 450 kilocycle, 15 kilowatt radio-frequency oscillator provided with a filter to reduce modulation.

A bar of 99.999 percent pure copper from the American Smelting and Refining Company is placed in the graphite boat and has a length of about 20 inches and a diameter generally of about 1 inch. The general shape of the rod being adapted to substantially completely fill the boat. The boat is placed within a vessel which is continuously flushed with pure dry argon at a rate of about 3 to 4 cubic feet per hour during the zone refining process. The argon flush assures the desired chemically inert atmosphere.

The radio-frequency coils must be separated a sufficient distance from each other to assure that the metal between molten zones will solidify. For zone widths of about 2½ inches the coils were spaced about 5 to 6 inches apart. To assure that this condition of solidification between molten zones is maintained during changes in the temperature of the ingot as the zones traverse the ingot, the power input to the coils may be suitably adjusted as required. In this way there will be provided a crystallization from the melt with the crystals all growing generally in the direction of travel of the moving molten zone.

By adjusting the power input, controlling heat losses, and regulating the rate of travel of the molten zones to produce a liquid-solid interface which is either flat or convex in the direction of travel, the resultant growth of solid having crystals with a surface-to-volume ratio no greater than 6 per centimeter is established. The rate of travel is about 15 inches per hour and the power input, and heat losses are controlled accordingly to produce the liquid solid interface either flat or convex in the direction of travel. Preferably, the convex liquid-solid interface configuration is established. Such control may be easily and conveniently provided by those skilled in the art to produce the desired liquid-solid interface configuration.

The copper blank so obtained was used to fabricate the regions of the electrodes of the vacuum circuit interrupter on which the respective electrode spot for an arc is established. Surface contaminants were removed from the electrodes by baking-out at a temperature of about 500° K. in well-known manner. The electrodes so fabricated were tested in accordance with the method set forth hereinbefore and the gas evolved during a given number of uniform arcings was measured. The electrodes were found to evolve only extremely small quantities of gas under such arcing conditions. Further measurements of the gas content within the evacuated chamber after such arcing of the electrodes indicated an electrode purity of about one part in $10^9$.

Electrodes comprising certain high vapor pressure metals are not suitable for use in vacuum circuit interrupters for practical reasons. For example, a minimum temperature for bake-out of the surface contaminants during construction of the vacuum circuit interrupter is about 500° K. Temperatures of this order cause certain of the high vapor pressure metals to vaporize to such a great extent that they would not be satisfactory for use as contacts in an interrupter. This is the case because if excessive vapors are generated during bake-out, these vapors, upon condensing, detrimentally coat the insulating surfaces of the interrupter to an objectionably great extent. For this reason a metal having a vapor pressure greater than about $10^{-3}$ millimeters of mercury at 500° K. would be unacceptable for either of the contacts of the vacuum circuit interrupter of this invention.

For a majority of the applications where chopping conditions are present, the chopping level is dependent to a much lesser degree upon the characteristics of the anode of the interrupter than on the characteristics of the cathode. For applications, therefore, where chopping depends predominately upon the cathode characteristics and where it can be predetermined that a particular one of the electrodes will serve as the cathode during the half cycle interrupting interval, this electrode can, if desired, comprise some suitable metal other than one having a high vapor pressure. For example, this electrode may comprise a refractory metal, in which case gas removal therefrom can be accomplished by the usual high temperature baking methods. However, all of those electrode regions upon which the cathode spots for low current arcs are likely to be established are comprised of high vapor pressure metals which have been freed of gas and gas-forming constituents by controlled directional crystallization in a chemically inert atmosphere to establish crystals having a surface-to-volume ratio of less than 6 per centimeter.

Some of the metals which are not suitable for use as electrodes for vacuum circuit interrupters in elemental form may be rendered suitable by alloying or mixing them wth other metals. The term "alloy" as used herein and in the appended claim is intended to be broad enough to include intimate mixtures and other combinations of metals which are essentially insoluble in each other in the solid phase but are soluble in the liquid phase, as well as the more common type of alloy which comprises elements that are mutually soluble in each other in the solid phase.

There has been described hereinbefore an improvd vacuum circuit interrupter having electrodes comprising high vapor pressure metals which electrodes evolve essentially no gas under arcing conditions thereby contributing to consistently and economically producing vacuum circuit interrupters which are more reliable, efficient, and have longer life than prior art vacuum circuit interrupters employing such high vapor pressure metal electrodes.

While a particular embodiment of this invention has been shown and described it will be obvious to those skilled in the art that various changes and modifications may be made without departing from the invention in its broader aspects. The appended claim, therefore, are intended to cover all such changes and modifications as fall within the true spirit and scope of this invention.

What I claim as new and desire to secure by Letters Patent of the United States is:

In a vacuum circuit interrupter having a pair of separable electrodes disposed within an envelope evacuated to a pressure lower than about $10^{-5}$ millimeters of mercury, and means for connecting said electrodes to a circuit to be interrupted the improvement comprising at least one electrode containing a portion including the arcing face thereof which comprises a gas and gas-forming constituent-free, easily vaporizable metal having a vapor pressure of less than $10^{-3}$ millimeters of mercury at 500° K. and a vapor pressure of greater than $10^{-3}$ millimeters of mercury at temperatures above 2000° K., said metal being freed from gases and gas-forming constitutents by a controlled directional crystallization in a chemically inert atmosphere with the resultant growth of a crystalline structure having crystals with a surface-to-volume ratio greater than zero and no greater than 6 per centimeter.

References Cited by the Examiner
UNITED STATES PATENTS

| | | | |
|---|---|---|---|
| 2,900,476 | 4/1959 | Reece | 200—144 |
| 2,975,256 | 3/1961 | Lee et al. | 200—144 |

OTHER REFERENCES

Zone Melting, William G. Pfann, published by John Wiley & Sons, Inc., New York, 1958.

Zone Refining and Allied Techniques, published by George Newnes Limited, N. L. Parr, London, 1960.

ROBERT K. SCHAEFER, *Primary Examiner.*

BERNARD A. GILHEANY, *Examiner.*